United States Patent Office 2,861,100
Patented Nov. 18, 1958

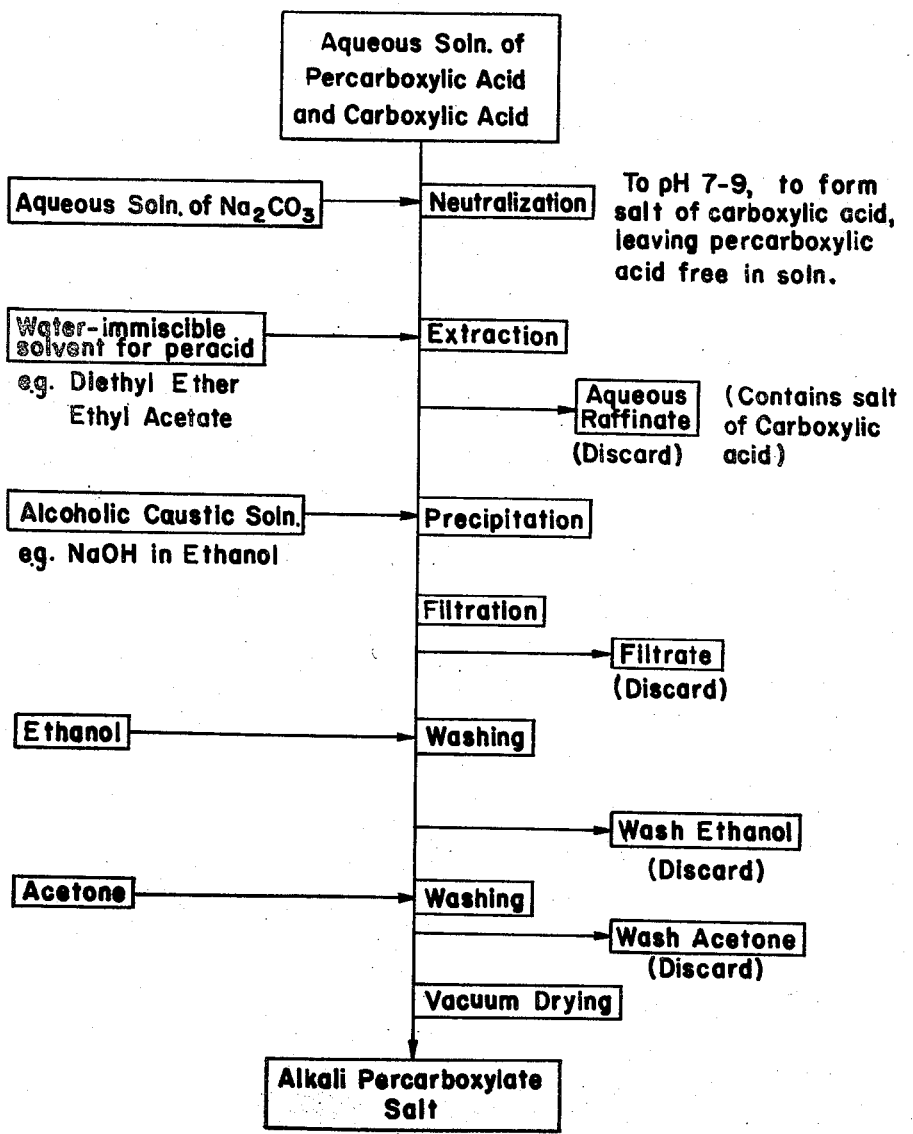

2,861,100

PREPARATION OF PERCARBOXYLATE SALTS

Leslie G. Humber, Rochester, N. Y., assignor to Shawinigan Chemicals Limited, West Montreal, Quebec, Canada, a corporation of the Dominion of Canada Application December 9, 1957, Serial No. 701,656

9 Claims. (Cl. 260—502)

The invention relates to a process for the preparation and isolation of the anhydrous salts of a saturated aliphatic percarboxylic acid.

Although the salts of inorganic peracids are well known in the literature, there has been relatively little written on the salts of the organic peracids, particularly in relation to the salts of saturated aliphatic peracids. A process for isolating solid sodium and calcium performate from ground green barley leaves is described by P. A. Kolesnikov, and reported in 1949 Chem. Abs. 4730. Process for the preparation of various camphoric peracids have been developed and described by Milas N. A. and McAlevy A. J. in the Journal of American Chemical Society 55, 349 (1933), and these processes involved the preparation of the corresponding sodium salts as intermediate compounds in obtaining the camphoric peracids.

Percarboxylic acids are usually prepared and available in solutions containing the corresponding carboxylic acid and water. The object of the present invention is to prepare the anhydrous salts of saturated aliphatic percarboxylic acid from a mixture containing the percarboxylic acid, its corresponding carboxylic acid, and water.

The invention consists of a process for the preparation of an anhydrous alkali salt of a saturated aliphatic percarboxylic acid, containing from 2 to 4 carbon atoms, from an aqueous solution of the percarboxylic acid and its corresponding carboxylic acid, comprising (1) neutralizing the carboxylic acid by adding sufficient weakly alkaline material to the aqueous solution of acids to form a soluble salt of the carboxylic acid without forming a salt of the percarboxylic acid, (2) extracting the percarboxylic acid from the aqueous solution with a water immiscible organic liquid solvent for the percarboxylic acid, (3) adding sufficient organic solvent solution of a strong alkali to the solution of percarboxylic acid to precipitate alkali percarboxylate from the solution, and (4) recovering the precipitate of alkali percarboxylate.

It has been observed that, in aqueous solutions of the indicated percarboxylic acids and their corresponding carboxylic acids, the carboxylic acids are more strongly ionized than the corresponding per acids, and consequently the carboxylic acids can be neutralized to alkali salts at lower pH values than their corresponding per acids.

The present invention can be more particularly described as comprising the following steps: To a mixture containing a saturated aliphatic percarboxylic acid, its corresponding carboxylic acid, and water is added (conveniently in aqueous solution) an alkaline material with which the carboxylic acid forms a soluble salt, in sufficient amount to convert all the carboxylic acid to the salt. Addition of the alkaline solution is stopped before the weaker percarboxylic acid is appreciably converted to salt. This point is usually reached between pH 7 and pH 9 for most carboxylic acids. The percarboxylic acid is then extracted from the aqueous medium with a water-immiscible organic solvent, leaving the salt of the carboxylic acid dissolved in the aqueous solution. An alkali solution in organic solvent, for example ethanolic sodium hydroxide, is added to the organic solvent solution of percarboxylic acid, thereby precipitating the salt of the peracid. The precipitated salt is filtered off, washed with alcohol to remove excess alkali, and finally washed with acetone, then dried, preferably under vacuum, to yield a substantially pure, anhydrous salt of the saturated aliphatic percarboxylic acid.

The invention is illustrated diagrammatically by the accompanying drawing in which Figure 1 shows a flow sheet of the process of the invention, including a modicum of detail.

The invention is further illustrated by the following examples.

*Example 1*

The saturated aliphatic percarboxylic acid used in this example and the subsequent example is the commercial peracetic acid supplied under the trademark "Becco" and has the following specification:

| | Percent by wt. |
|---|---|
| Peracetic acid | [1] 40 |
| Hydrogen peroxide | 5 |
| Acetic acid | 39 |
| Sulphuric acid | 1 |
| Water | 13 |
| | 98 |

[1] Minimum.

20.0 mls. of "Becco" peracetic acid were agitated at 8–10° C. with 14.0 gms. dry powdered sodium carbonate monohydrate ($Na_2CO_3.H_2O$) to neutralize the acetic acid therein and bring the pH of the mixture to about 7.7, as measured by a glass and calomel electrode. To the resulting mixture were added 35.0 mls. of water and then 35.0 mls. of acetone in an attempt to precipitate peracetate salt. No precipitate formed. Then 16.0 mls. ethanol were added and the mixture allowed to stand overnight in a further attempt to precipitate salt. Still no precipitate formed. The solution was then diluted with 125.0 mls. of water and extracted successively with a 40 mls. portion and two 20 mls. portions of diethyl ether, to obtain an ether solution of peracetic acid. To the combined ether extracts was added an ethanol solution of sodium hydroxide to increase the pH of the extracts to 10, as determined by pH test papers. Sodium peracetate salt precipitated from the solution immediately and was filtered off under gentle suction, washed with ether and dried overnight in a vacuum desiccator at 0.5 mm. pressure. The dried precipitate weighed 1.3 gms. The mother liquor from the first precipitate was diluted with 200 mls. of acetone, and a second precipitate of sodium peracetate formed. It was washed and dried in the same manner as the first precipitate, and was found to weigh 0.75 gm. The first precipitate was separately analyzed for active oxygen content by dissolving a sample thereof in water, adding 1 normal $H_2SO_4$ and excess 10% aqueous potassium iodide solution, allowing the sample to stand for a half hour, then titrating the liberated iodine with standardized sodium thiosulfate solution. The salt was found to contain 100.6% of the active oxygen theoretically present in sodium peracetate.

The salt was likewise analyzed for sodium content by converting a sample to sodium sulfate with concentrated sulfuric acid, drying, and weighing. It was found to contain 103.7% of the theoretical amount of sodium in peracetate salt.

The sodium peracetate salt was found to show a strong alkaline reaction when dissolved in water, and to be substantially insoluble in diethyl ether, ethanol, and acetone. It was found to decompose rapidly at about 55° C., and to decompose slowly at room temperature as evidenced by analysis for active oxygen content of one sample stored 24 hours under vacuum and another sample stored 7 days in a desiccator. The sample after 24 hours contained only 44% of the theoretical of active oxygen, and the sample after seven days contained only 7.15% of the theoretical of active oxygen.

*Example 2*

50 mls. of "Becco" peracetic acid were brought to pH 8.0 by addition of a saturated aqueous solution of Na₂CO₃. The resulting mixture was extracted six times with 50 mls. portions of ether, and the combined extracts dried over anhydrous MgSO₄. Analysis of a portion of the combined extracts showed that the remaining 250 mls. of combined extract contained 5.94 gms. of peracetic acid. To this was added an equivalent amount of sodium hydroxide to form sodium peracetate by dissolving 3.13 gms. NaOH in 5 mls. of water, diluting the solution with 70 mls. of alcohol, cooling the materials to 0° C., and mixing the extract and caustic solution. The sodium peracetate precipitated immediately and after 15 minutes was filtered off, washed with ether, and dried in a desiccator at 5 mm. pressure. The sodium peracetate salt was found to liberate gas, presumably oxygen, when it was dissolved in cold water. Identity of the salt was established by its ability to liberate iodine from aqueous potassium iodide solution as described in the method of analysis in the preceding example.

*Example 3*

Perbutyric acid in aqueous butyric acid solution was prepared by mixing 30 mls. butyric acid, 0.5 ml. concentrated sulfuric acid, 18.7 gms. (about 14 mls.) of 90% commercial hydrogen peroxide, and about 15 mls. acetone. A portion of the mixture was analyzed after 48 hours at room temperature and was found to contain 5.7% peracid. The mixture was then brought to pH about 8 by addition of saturated aqueous Na₂CO₃ solution, and the aqueous mixture extracted five times with 50 mls. portions of ether. A portion of the combined extracts was analyzed, and the remaining 225 mls. of extract were calculated to contain 2.74 gms. perbutyric acid, equivalent to 1.05 gms. NaOH. Then 1.05 gms. NaOH were dissolved in 2 mls. water and diluted with 20 mls. ethanol and 50 mls. isopropanol. The acid and caustic solutions were then mixed at 0–5° C. and sodium perbutyrate salt precipitated therefrom very slowly at 0–5° C. over a period of two hours. The precipitate was filtered off, washed with ether, and dried in a vacuum desiccator at 5 mm. pressure for 30 minutes. The salt was found not to decompose observably when heated to 290° C. on a Fisher-Johns melting point block. It was found to liberate gas, presumably oxygen, on solution in dilute aqueous acid. The filtrate from the precipitated salt was allowed to stand at 0° C. for 5 days, during which time a second crop of sodium perbutyrate salt precipitated. This second crop of salt was filtered, washed, and dried separately as was the first one. 50 mgms. of this salt was dissolved in water and cooled to 0° C. 15 mls. of 10% aqueous potassium iodide solution and 200 mls. of 1 normal sulfuric acid solution were mixed and cooled to 0° C. The cooled solutions were then combined and allowed to stand while iodine was liberated, and the iodine titrated with standard thiosulfate solution. No further iodine was liberated after 75 minutes, and the titration of 7.7 mls. of 0.1043 normal Na₂S₂O₃ solution indicated the presence of 101% of the theoretical quantity of active oxygen in the salt.

The alkaline material used in the foregoing examples for converting the carboxylic acids to their corresponding salts is sodium carbonate, but any material which is sufficiently alkaline to convert the acid to salt may be used, for example ammonium hydroxide, potassium carbonate, sodium hydroxide, anhydrous ammonia and lime water.

Examples of water-immiscible solvents suitable for extracting the peracid from aqueous medium include ethyl acetate and di-ethyl ether. Examples of suitable precipitants for the percarboxylic acids to form percarboxylate salts include the alcoholic solutions of the alkali hydroxides, e. g. KOH and NaOH, and alcoholic solutions of alkali alkoxides, e. g. sodium ethylate in ethanol solution. Ether solutions of alkalis may also be used.

As different embodiments of this invention may be made without departing from the spirit and scope thereof, it is to be understood that the invention is not limited to the specific embodiment disclosed except as defined in the appended claims.

What is claimed is:

1. A process for the preparation of an anhydrous alkali salt of a saturated aliphatic percarboxylic acid, containing from 2 to 4 carbon atoms, from an aqueous solution of the percarboxylic acid and its corresponding carboxylic acid, comprising (1) neutralizing the carboxylic acid by adding sufficient weakly alkaline material to the aqueous solution of acids to form a soluble salt of the carboxylic acid without forming a salt of the percarboxylic acid, (2) extracting the percarboxylic acid from the aqueous solution with a water immiscible organic liquid solvent for the percarboxylic acid, (3) adding sufficient organic solvent solution of a strong alkali to the solution of percarboxylic acid to precipitate alkali percarboxylate from the solution, and (4) recovering the precipitate of alkali percarboxylate.

2. A process as claimed in claim 1, in which sufficient weakly alkaline material is added to the aqueous solution of acids to bring the pH of the solution to a value between 7.0 and 9.0.

3. A process as claimed in claim 2, in which the weakly alkaline material is a saturated aqueous solution of sodium carbonate.

4. A process as claimed in claim 3, in which the water immiscible solvent for extracting the percarboxylic acid is selected from the group consisting of diethylether and ethyl acetate.

5. A process as claimed in claim 4, in which the organic solvent solution of strong alkali is an alcoholic solution of a material of the group consisting of alkali hydroxides and alkali alkoxides.

6. A process as claimed in claim 1, in which the percarboxylic acid is peracetic acid.

7. A process as claimed in claim 6 in which the pH of the aqueous solution of acids is brought to about 8.0 by addition of aqueous sodium carbonate solution.

8. A process as claimed in claim 7, in which the peracetic acid is extracted from the aqueous solution with successive portions of diethyl ether.

9. A process as claimed in claim 8, in which ethanolic sodium hydroxide solution is added to the ether solution of peracetic acid to precipitate sodium peracetate.

References Cited in the file of this patent

UNITED STATES PATENTS 2,377,038    Reichert et al. _____ May 29, 1945

OTHER REFERENCES

Brooks et al.: J. Am. Chem. Soc. 55, 4310–11 (1933).